(12) United States Patent
Delavaux et al.

(10) Patent No.: US 11,509,109 B2
(45) Date of Patent: Nov. 22, 2022

(54) BROADBAND TM-DOPED OPTICAL FIBER AMPLIFIER

(71) Applicant: Cybel, LLC., Bethlehem, PA (US)

(72) Inventors: Jean-Marc Delavaux, Pittstown, NJ (US); Robert E. Tench, Allentown, PA (US); Alexandre Amavigan, Whitehall, PA (US)

(73) Assignee: Cybel, LLC., Bethlehem, PA (US)

( * ) Notice: Subject to any disclaimer, the term of this patent is extended or adjusted under 35 U.S.C. 154(b) by 0 days.

(21) Appl. No.: 16/812,493

(22) Filed: Mar. 9, 2020

(65) Prior Publication Data

US 2021/0281036 A1 Sep. 9, 2021

(51) Int. Cl.
| | | |
|---|---|---|
| *H01S 3/067* | (2006.01) | |
| *H01S 3/094* | (2006.01) | |
| *H01S 3/16* | (2006.01) | |
| *H01S 3/0941* | (2006.01) | |
| *H01S 3/23* | (2006.01) | |

(52) U.S. Cl.
CPC ........ *H01S 3/06762* (2013.01); *H01S 3/0675* (2013.01); *H01S 3/0941* (2013.01); *H01S 3/094007* (2013.01); *H01S 3/094042* (2013.01); *H01S 3/094061* (2013.01); *H01S 3/094096* (2013.01); *H01S 3/1616* (2013.01); *H01S 3/2308* (2013.01); *H01S 3/2316* (2013.01); *H01S 2301/02* (2013.01)

(58) Field of Classification Search
CPC ...... H01S 3/094042–094046; H01S 3/094061; H01S 3/2316; H01S 3/2308
See application file for complete search history.

(56) References Cited

U.S. PATENT DOCUMENTS

| | | | | |
|---|---|---|---|---|
| 5,594,747 A | * | 1/1997 | Ball ........................ | H01S 3/067 372/31 |
| 5,668,659 A | * | 9/1997 | Sakamoto ........... | H01S 3/06708 359/341.5 |
| 5,933,437 A | * | 8/1999 | Delavaux ............... | H01S 3/067 372/6 |
| 6,061,170 A | * | 5/2000 | Rice .................... | H01S 3/06716 359/345 |
| 6,081,369 A | * | 6/2000 | Waarts ................ | H01S 3/13013 359/341.33 |

(Continued)

FOREIGN PATENT DOCUMENTS

| | | | |
|---|---|---|---|
| CN | 103794981 A | * | 5/2014 |
| CN | 107275917 A | * | 10/2017 |

(Continued)

*Primary Examiner* — Joshua King (74) *Attorney, Agent, or Firm* — Wendy W. Koba (57) ABSTRACT

A broadband optical amplifier for operation in the 2 μm visible wavelength band is based upon a single-clad Tm-doped fiber amplifier (TDFA). A compact pump source uses a combination of low-power laser diode with a fiber laser to provide a multi-watt pump beam without needing to include thermal management and/or pump wavelength stability components. The broadband optical amplifier is therefore able to be relatively compact device with fiber coupled output powers of >0.5 W CW, high small signal gain, low noise figure, and large OSNR, important for use as a versatile wideband preamplifier or power booster amplifier.

19 Claims, 7 Drawing Sheets

(56) References Cited

U.S. PATENT DOCUMENTS

| | | | |
|---|---|---|---|
| 6,151,338 A * | 11/2000 | Grubb | H01S 3/10023 372/6 |
| 6,335,941 B1 * | 1/2002 | Grubb | H01S 3/10023 359/337.2 |
| 6,347,007 B1 * | 2/2002 | Grubb | H01S 3/10023 359/337.2 |
| 6,407,853 B1 | 6/2002 | Samson et al. | |
| 6,433,306 B1 * | 8/2002 | Grubb | H01S 3/10023 219/121.65 |
| 6,476,960 B1 | 11/2002 | Traynor et al. | |
| 6,501,596 B1 * | 12/2002 | Inoue | H01S 3/06754 359/341.3 |
| 6,697,393 B2 * | 2/2004 | Kasamatsu | H01S 3/094003 372/23 |
| 6,885,683 B1 * | 4/2005 | Fermann | H01S 3/06754 372/25 |
| 7,113,328 B2 | 9/2006 | Gomes et al. | |
| 7,298,547 B1 | 11/2007 | Jiang et al. | |
| 7,313,306 B2 | 12/2007 | Yamada et al. | |
| 8,311,065 B2 * | 11/2012 | Tsai | H01S 3/094042 372/6 |
| 9,112,329 B2 | 8/2015 | Fan | |
| 9,466,939 B2 | 10/2016 | Moulton et al. | |
| 9,684,077 B2 | 6/2017 | Mead et al. | |
| 2002/0021882 A1 * | 2/2002 | Wyatt | C03C 3/097 385/142 |
| 2003/0063629 A1 * | 4/2003 | Davis | H01S 3/063 372/6 |
| 2003/0202547 A1 * | 10/2003 | Fermann | G02B 6/26 372/6 |
| 2003/0231380 A1 * | 12/2003 | Gomes | H01S 3/094003 359/341.3 |
| 2005/0238070 A1 * | 10/2005 | Imeshev | H01S 3/06758 372/21 |
| 2007/0248138 A1 * | 10/2007 | Murison | B23K 26/21 372/70 |
| 2009/0092157 A1 * | 4/2009 | Gapontsev | H01S 3/094003 372/6 |
| 2010/0110535 A1 * | 5/2010 | Murison | G02B 6/2746 359/341.3 |
| 2010/0220752 A1 * | 9/2010 | Liu | H01S 3/2308 372/6 |
| 2011/0306956 A1 * | 12/2011 | Islam | A61B 18/20 606/15 |
| 2013/0044768 A1 * | 2/2013 | Ter-Mikirtychev | H01S 3/0092 372/5 |
| 2013/0107351 A1 * | 5/2013 | Clowes | H01S 3/2308 359/341.3 |
| 2013/0322470 A1 * | 12/2013 | Creeden | H01S 3/1616 372/6 |
| 2017/0155225 A1 * | 6/2017 | Villeneuve | G01S 17/88 |
| 2018/0261969 A1 * | 9/2018 | Augst | H01S 3/1618 |
| 2020/0194959 A1 * | 6/2020 | Friedenauer | H01S 3/1301 |

FOREIGN PATENT DOCUMENTS

| | | | | |
|---|---|---|---|---|
| CN | 108899748 A | * | 11/2018 | |
| CN | 112290362 A | * | 1/2021 | |
| FR | 2856849 A1 | * | 12/2004 | H01S 3/06754 |
| JP | 2013511851 A | * | 4/2013 | H01S 3/06758 |

* cited by examiner

BROADBAND TM-DOPED OPTICAL FIBER AMPLIFIER

TECHNICAL FIELD

The present invention relates to rare-earth doped optical fiber amplifiers and, more particularly, to a Thulium (Tm)-doped fiber amplifier particularly configured to operate over a relatively wide bandwidth within the 2 µm wavelength region.

BACKGROUND

There is a continuing need to develop optical systems that are capable of operating in the eye-safe 1.90-2.15 µm wavelength range. Applications such as LIDAR, atmospheric sensing (e.g., $CO_2$), WDM communication systems, and the like, are among those that will need to rely on high performance optical devices that operate within this 2 µm wavelength region. In many situations, the amount of physical space that may be dedicated to these optical systems is severely limited (e.g., vehicle-based LIDAR systems) and the ability to provide sufficient amplification within a space somewhat less than the footprint of a typical smartphone is desirable.

To date, multiwatt Tm-doped fiber amplifiers (TDFAs) have been one option for providing signal gain in this 2 µm wavelength band. In most cases, the TDFAs are based upon the use of a double-clad (or triple-clad) gain fiber, where the multiple cladding layers not only result in a fiber coil of relatively large size, but also have particular coupling/connection requirements to input and output fibers.

SUMMARY OF THE INVENTION

The needs remaining in the art are addressed by the present invention, which relates to rare-earth doped fiber amplifiers and, more particularly, to a Thulium (Tm)-doped fiber amplifier particularly configured to operate over a relatively wide bandwidth within the 2 µm wavelength region.

In accordance with the principles of the present invention, a section of single-clad, Tm-doped optical fiber is used as the gain element. The use of a single-clad optical fiber allows for both the propagating optical signal and pump beam to be coupled into the core region of the fiber.

An intent of the inventive Thulium-doped fiber amplifier (TDFA) is to provide a miniaturized device with fiber coupled output powers of >0.5 W CW, high small signal gain, low noise figure, and large OSNR that can be used as a versatile wideband preamplifier or power booster amplifier.

An exemplary embodiment of the present invention takes the form of an optical amplifier for operation at an eye-safe input signal wavelength $\lambda_s$ within the 2 µm region, and uses a section of single-clad optical gain fiber in combination with a fiber laser-based pump source to form a relatively compact amplifier component. In particular, the section of single-clad optical gain fiber includes a Tm-doped core region, where an input signal is coupled into an input endface of the Tm-doped core region of the single-clad optical gain fiber so as to propagate therealong and exit at an output endface thereof. The pump source includes a low power (e.g., milli-watt) laser diode source, which is used with a fiber laser to create multi-watt pump light at a defined pump wavelength $\lambda_{P2}$.

The amplifier elements may be formed of either standard single mode optical fiber (i.e., non-polarization-maintaining), or fiber of polarization-maintaining construction. For applications that operate with a single polarization signal, polarization-maintaining fiber is preferably used in order to maintain the orientation of the propagating signal along a designated axis without the need for additional polarization controlling elements. Moreover, the propagating signal may take the form of a pulsed input signal (for transmission of digital data, for example) or a continuous wave (CW) optical input. In yet another embodiment, an amplifier of the present invention may utilize only a pump light input, generating amplified spontaneous emission (ASE) over a relatively broad range, where ASE is often used as a continuum source in systems supporting the transmission of multiple wavelengths.

Other and further embodiments and aspects of the present invention will become apparent during the course of the following discussion and by reference to the following drawings.

BRIEF DESCRIPTION OF THE DRAWINGS

Referring now to the drawings, where like numerals represent like parts in several views.

DETAILED DESCRIPTION

Figure 1:
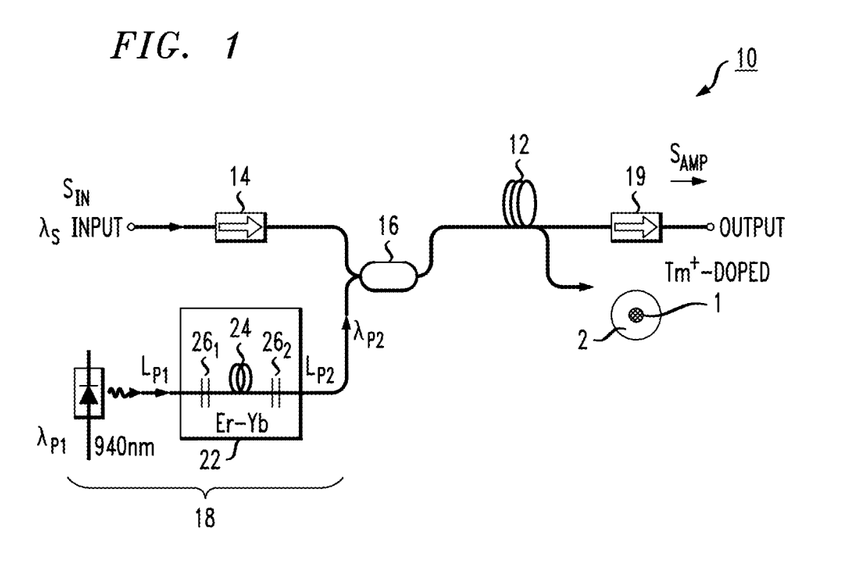
FIG. 1 contains a block diagram of an exemplary Tm-doped fiber amplifier (TDFA) formed in accordance with the principles of the present invention.

FIG. 1 contains a block diagram of an exemplary Tm-doped fiber amplifier (TDFA) 10 formed in accordance with the principles of the present invention. TDFA 10 is based upon the use of a section of single-clad optical fiber 12 that has been fabricated to include a Tm-doped core region 1, surrounded by a silica-based cladding layer 2 (shown in the inset of FIG. 1). In contrast to various prior art TDFAs that are based upon the use of at least a "double-clad" gain fiber, the arrangement of the present invention operates in a limited region of output power that allows for a single-clad optical fiber to be used as the gain fiber. Advantageously, the use of single-clad optical fiber simplifies the optical coupling into and out of the gain fiber, while also allowing the final product to fit within a relatively small footprint.

As mentioned above, recent developments in various types of optical-based sensing applications have created the need for optical systems that operate in the eye-safe wavelength band of 1.9-2.1 µm. One need is for an optical amplifier that is able to impart an appreciable level of gain to input signals across a relatively wide wavelength region within this eye-safe band; that is, there is an on-going need for an eye-safe broadband amplifier (the ability to function over a broad input signal range particularly useful when implemented as a preamplifier component).

FIG. 1 shows an input optical signal (denoted $S_{IN}$) operating within this eye-safe band being used as the input signal for TDFA 10. For the sake of explanation, input signal $S_{IN}$ is defined as being a single frequency input, operating at an input wavelength $\lambda_s$ of 1909 nm (i.e., within this general 2 µm band associated with "eye safe" optical signals). Input optical signal $S_{IN}$ is shown in FIG. 1 as passing through an input isolator 14 and thereafter coupled to a signal port of a wavelength division multiplexer (WDM) 16. Pump light $L_{P2}$ from a multi-watt pump source 18 operating at an appropriate pump wavelength $\lambda_{P2}$ (here, shown as about 1567 nm) is coupled into a pump port of WDM 16, with the output from WDM 16 being a combination of both the input signal $S_{IN}$ and pump light $L_{P2}$. The combination of $S_{IN}$ and $L_{P2}$ is thereafter applied as an input to single-clad gain fiber 12. In particular, WDM 16 is configured to couple these inputs into Tm-doped core region 1 of single-clad gain fiber 12.

The arrangement as shown in FIG. 1 is referred to as a "co-propagating" amplifier configuration since both the input signal $S_{IN}$ and pump light $L_{P2}$ are coupled into the same end of single-clad gain fiber 12. Amplification of input signal $S_{IN}$ within single-clad gain fiber 12 is achieved via a process well-known in the art where presence of pump light $L_{P2}$ at an appropriate wavelength (e.g., $\lambda_{P2}$=1567 nm) functions to excite the Tm ions present in core region 1 of gain fiber 12, resulting in amplification of input optical signal $S_{IN}$. The amplified output signal $S_{AMP}$ from single-clad gain fiber 12 is shown in FIG. 1 as passing through an output isolator 19 before exiting TDFA 10.

In accordance with the principles of the present invention, pump source 18 is particularly configured to utilize the combination of a discrete, low-power semiconductor laser diode 20 and a fiber laser 22, as shown in FIG. 1, so as to create a multi-watt power pump output $L_{P2}$ without needing to provide thermal management of the pump light source. That is, the utilization of a fiber laser with a discrete laser diode allows for a milli-watt power laser diode to be used as the pump light input to fiber laser 22 (with laser diode 20 provided in a simple "uncooled" subassembly), with the milli-watt laser diode output power increased to a level in the range of about 1-3 W after passing through fiber laser 22. In one exemplary embodiment, laser diode 20 may comprise a GaAs laser diode emitting at a wavelength $\lambda_{P1}$ of about 940 nm, which is used as a pump input to fiber laser 22, thus generating a multi-watt pump output $L_{P2}$ at a useful pump wavelength $\lambda_{P2}$ of about 1567 nm.

In one exemplary embodiment of pump source 18, fiber laser 22 may comprise a section of Er—Yb co-doped fiber 24, disposed between a pair of reflective surfaces 261, 262 to form a laser cavity. To maintain a compact configuration, the reflective surfaces are preferably formed as a pair of fiber Bragg gratings (FBGs) inscribed directly in fiber 24. Since the generated pump power need only be in the range of about 1-3 W, only a few meters of Er—Yb co-doped fiber may be required. The output from laser diode 20 is coupled into fiber laser 22, where this first pump light operating at a $\lambda_{P1}$ of about 940 nm resonates within the laser cavity, exciting the Er and Yb ions until reaching a sufficient energy level to be emitted as the pump light $L_{P2}$, operating at the output (i.e., "second") pump wavelength $\lambda_{P2}$ of about 1567 nm. The wavelength of 1567 nm is only one wavelength that is appropriate for use in a Tm-doped gain fiber, selected here for explanatory purposes only.

In accordance with the principles of the present invention, therefore, a milli-watt, uncooled laser diode 20 may thus be used in conjunction with a fiber laser 22 to create a pump output having a power greater than 1 W. As will be discussed in detail below, it is an aspect of the present invention that the use of a pump operating in the 1-3 W regime is able to provide the desired large bandwidth and high small signal gain of the inventive amplifier, while also maintaining a relatively low noise figure (and, as a result a high optical signal-to-noise ratio (OSNR)).

Figure 2:
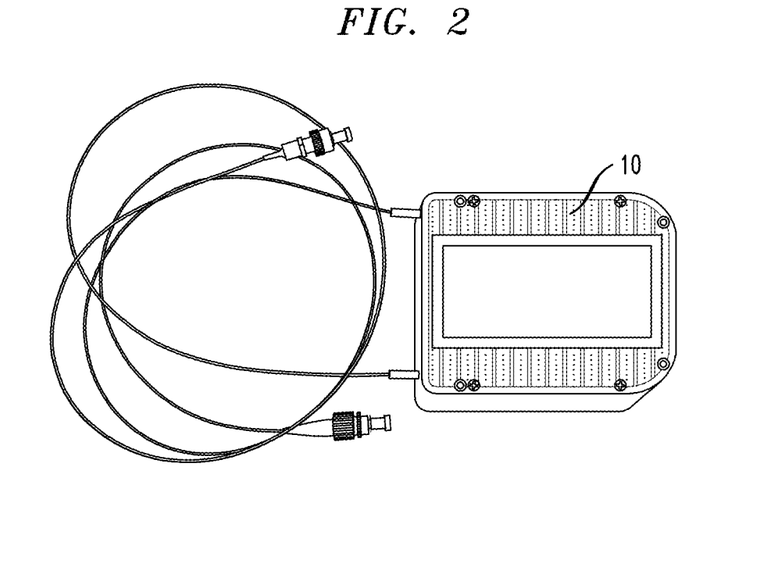
FIG. 2 is a photograph of an exemplary packaged version of a TDFA formed in accordance with the present invention.

Advantageously, the use of fiber laser 22 in this manner simplifies the design of pump source 18 and eliminates the need to be concerned about maintaining wavelength stability of the laser diode, providing thermal management of the laser diode (e.g., including a thermos-electric cooler in the subassembly, for example), and the like. As a result, it is possible to maintain the overall size of the inventive broadband TDFA within a relatively small footprint. Besides the ability to use an uncooled pump source, as discussed above, a miniaturized isolator/WDM combination may be used as elements 14, 16 to further control the overall size of the amplifier. Indeed, a fully assembled and packaged TDFA formed in accordance with the present invention has been made to have the dimensions of 97×78×15 mm3, where this fully assembled structure incorporates full pump control electronics and an RS232 interface for communication purposes. FIG. 2 is a depiction of an exemplary "packaged" compact inventive TDFA constructed in this manner, with a business card-sized rectangle placed on top of the package for the purposes of physical size (footprint) comparison.

Figure 3:
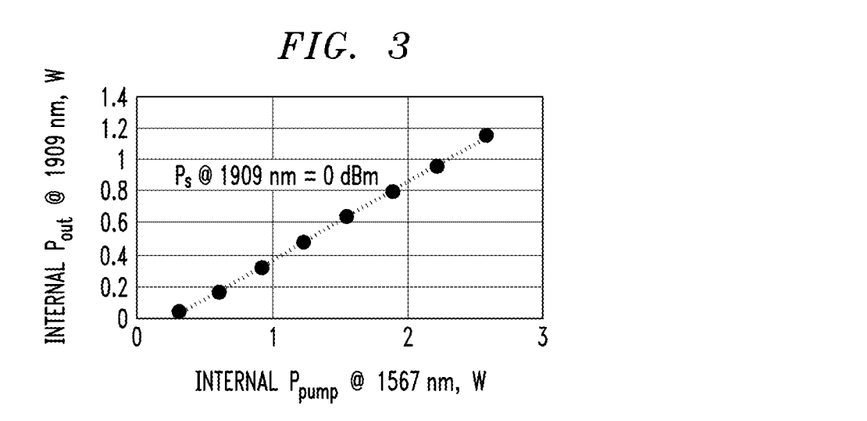
FIG. 3 contains a graph of the optical slope efficiency for a specific configuration of the inventive TDFA as shown in FIG. 1.

FIG. 3 is a graph depicting the optical slope efficiency of inventive TDFA 10, the slope efficiency defined here as the change in generated output power as a function of changes in pump power (while the input signal power is held fixed). The input signal power (measured at the input of gain fiber 12) is designated as $P_s$ and output signal power (measured at the output of gain fiber 12) is designated as $P_{out}$. The total pump power from pump source 18 that is available to couple into single-clad gain fiber 12 is designated as $P_{P2}$. For the purposes of creating the data shown in FIGS. 3-5, a linearly polarized input signal $S_{IN}$ was used, and all fiber sections (including single-clad gain fiber 12) were formed of polarization-maintaining optical fiber. The orientation between the various fibers and components is maintained such that input signal $S_{IN}$ propagates through TDFA 10 on the slow fiber axis. It is to be understood that the use of polarization-maintaining fiber is only one exemplary embodiment of a TDFA formed in accordance with the present invention and that other configurations may be based upon standard single mode fiber (the latter suitable when the polarization of the incoming signal is not a factor to be considered in the amplifier's performance).

In particular, FIG. 3 plots amplifier output power $P_{out}$ as a function of changes in pump power ($P_{P2}$) for an input signal $S_{IN}$ operating a signal wavelength $\lambda_s$=1909 nm, while maintaining a fixed input power ($P_s$=0 dBm). The measured values of $P_{out}$ are shown to vary linearly with $P_{P2}$ as expected, with a maximum output power of 1.15 W shown as being associated with a pump power $P_{P2}$ of 2.58 W. An aspect of the present invention is the ability to provide an output power of at least 0.5 W over a wide region of the 2 µm band, so the 1.15 W generated by TDFA 10 clearly exceeds this goal, while using only single-clad Tm-doped gain fiber 12, thus able to maintain the "miniaturized design" requirement.

Figure 4:
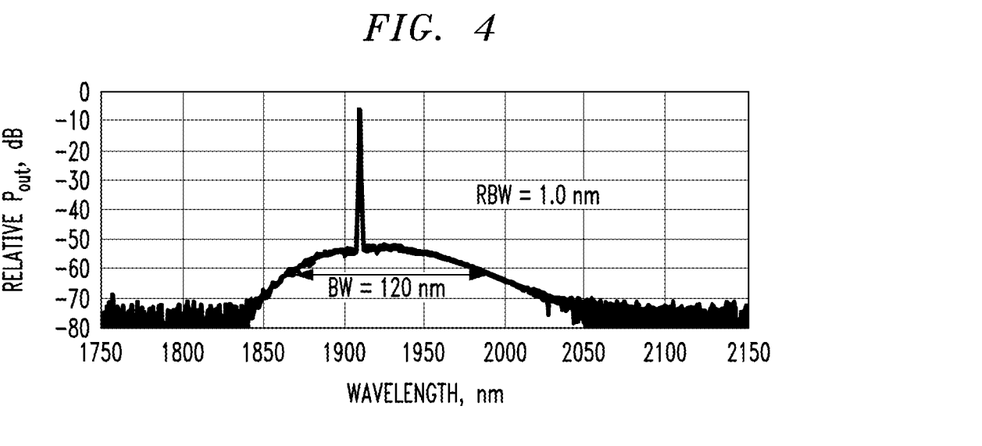
FIG. 4 is a graph of the saturated output spectrum for the same configuration of an inventive TDFA as used to provide the data plotted in the graph of FIG. 3.

An exemplary saturated output spectrum for this same configuration of TDFA 10 is shown in FIG. 4. Again, the power level of input signal $S_{IN}$ was maintained at $P_s$=0 dBm (for a single frequency input signal operating at $\lambda_s$=1909 nm). Pump light $L_{P2}$ was configured to maintain a pump power $P_{P2}$ of 2.58 W for the purposes of measuring the spectral response. As illustrated by the spectral data, the estimated output power bandwidth of the saturated amplifier was about 120 nm, with the peak associated with the input signal wavelength $\lambda_s$ of 1909 nm clearly visible. The power surrounding this peak is the noise associated with amplified spontaneous emission (ASE), with the measured optical signal-to-noise ratio (OSNR) being about 58.1 dB/0.1 nm. This high OSNR value is desirable for applications such as LIDAR and DWDM transmission systems.

Figure 5:
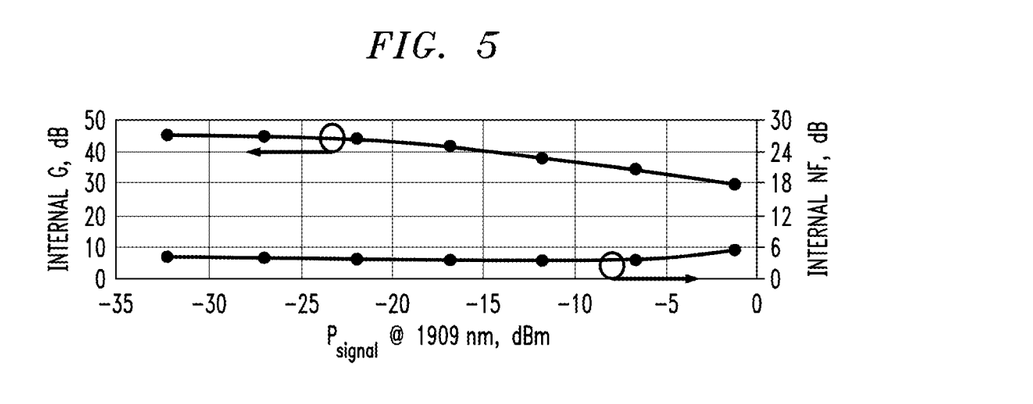
FIG. 5 contains plots of the gain and noise figure for this same TDFA configuration.

Recall that one goal of the present invention is to provide a fiber-based optical amplifier that is capable of operating in the eye-safe, visible 1.9-2.1 µm band, providing high small signal gain over a relatively wide bandwidth while maintaining a high OSNR (and also being relatively compact in form). FIG. 5 contains plots of the gain and noise figure for TDFA 10 as a function of input signal power ($P_s$), again associated with an input signal $S_{IN}$ operating at a wavelength $\lambda_s$ of 1909 nm. These gain and noise figure values are associated with pump source 18 operating at the wavelength of $\lambda_{P2}$ of about 1567 nm, with a pump power $P_{P2}$ held at 1.55 W (somewhat less than saturation).

In reviewing the data of FIG. 5, it is seen that the small signal gain G reaches a maximum value of 46 dB (for an input power of about −33 dBm), where the noise figure (NF) is approximately 4.0 dB for this level of small signal gain. As expected, G decreases with increasing $P_s$ and trends to a linear asymptote. The measured NF rises to approximately 5.5 dB for the maximum input signal power of −1.5 dBm. The high gain and low noise figure indicate that TDFA 10 is well-suited for use as an optical preamplifier in the visible 2 µm wavelength band.

Figure 6:
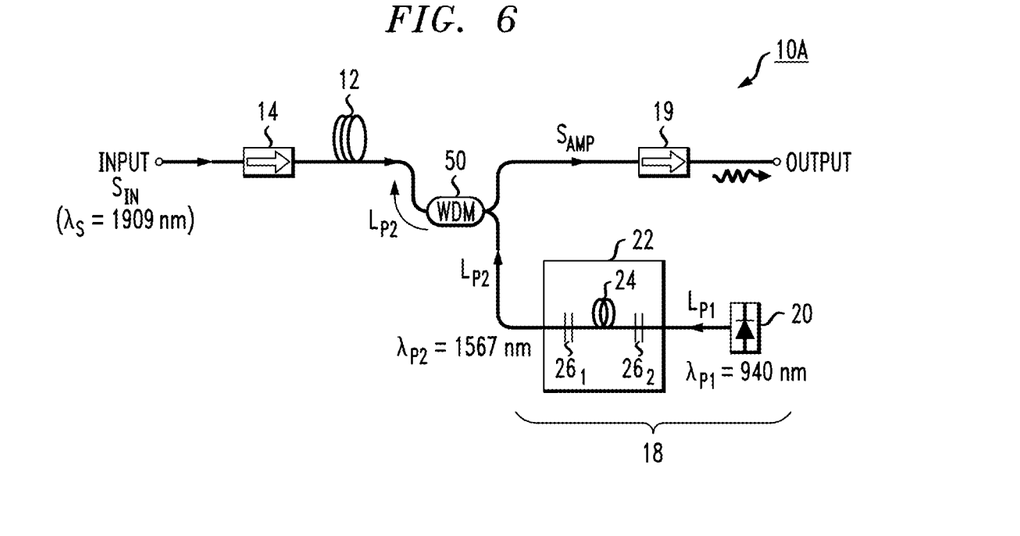
FIG. 6 is a block diagram of an alternative embodiment of the amplifier of FIG. 1, in this case utilizing a counter-propagating pump source.

FIG. 6 illustrates an alternative embodiment of the present invention, in this case taking the form of a counter-propagating TDFA. Identified as TDFA 10A, the configuration as shown in FIG. 6 utilizes a similar single-clad gain fiber 12, pump source 18 and isolators 14, 19 as described above in association with TDFA 10 of FIG. 1. Here, however, in order to create a counter-propagating fiber amplifier configuration, a WDM 50 is disposed at the output of single-clad gain fiber 12, with pump source 18 coupled to a pump input port of WDM 50 and used to direct pump light $L_{P2}$ through gain fiber 12 in a counter-propagating direction (i.e., counter to the direction of propagation of input signal $S_{IN}$ through gain fiber 12). Again, pump source 18 is based upon the use of an uncooled laser diode in combination with a fiber laser to create a multi-watt pump beam at an appropriate pump wavelength.

TDFA 10A functions in the same manner as TDFA 10 of FIG. 1 in terms of using pump light at a wavelength $\lambda_{P2}$ of 1567 nm (for example) to excite the Tm ions present in single-clad gain fiber 12 and thus amplify the propagating optical signal (that is, imparting gain to the propagating signal by transferring the energy associated with the ion excitation to signal $S_{IN}$), forming an output amplified signal $S_{AMP}$.

In contrast to co-pumping TDFA 10 of FIG. 1, counter-propagating pump light $L_{P2}$ in the arrangement of FIG. 6 interacts with propagating input signal $S_{IN}$ in a very different manner, since the power level of pump light $L_{P2}$ is greatest at the far-end of single-clad gain fiber 12 and thereafter diminishes as pump light $L_{P2}$ propagates towards the input end of gain fiber 12 (where the power $P_s$ of the input signal $S_{IN}$ is the greatest). The counter-propagating amplifier arrangement thus can create similar gain (in terms of magnitude), while also providing greater slope efficiency and power conversion efficiency than the co-propagating embodiment.

Figure 7:
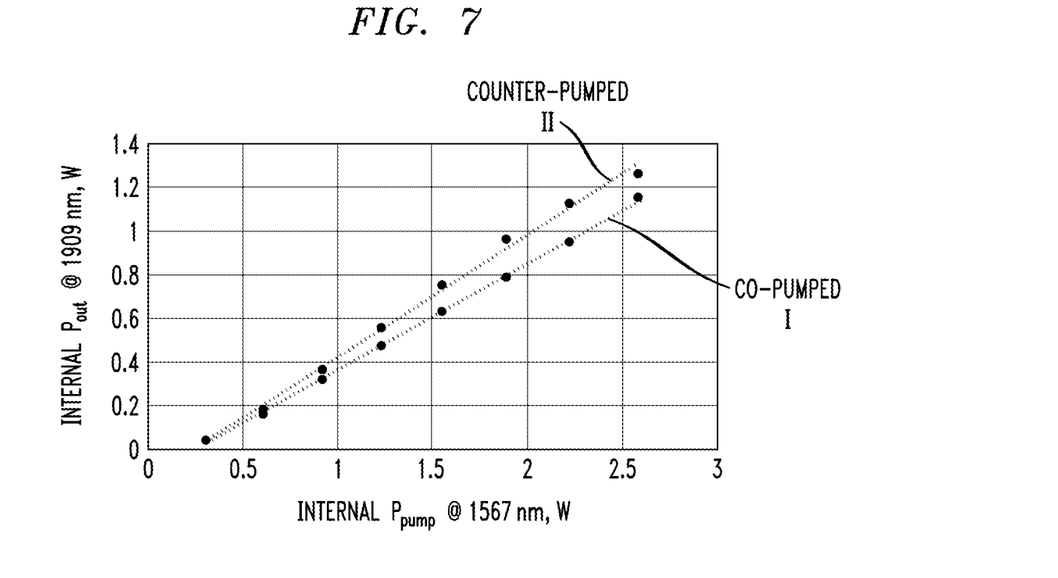
FIG. 7 contains graphs of the optical slope efficiency for a specific counter-propagating configuration of the inventive TDFA as shown in FIG. 6, with the data from the co-propagating embodiment as shown in FIG. 3 included here as well for the sake of comparison.

FIG. 7 illustrates this difference in optical slope efficiency between co-pumped TDFA 10 of FIG. 1 and outer-pumped TDFA 10A of FIG. 6. Plot I in FIG. 7 is associated with co-pumped TDFA 10 and is in fact the same data shown in FIG. 3, above. Plot II illustrates the optical slope efficiency for counter-pumped TDFA 10A of FIG. 6. It is clear that the optical slope efficiency increases for counter-pumped TDFA 10A (e.g., increasing from about 48.6% to 56.5% in one example). For counter-pumped TDFA 10A, plot II also shows that a maximum output power $P_{out}$ of 1.265 W was achieved (again, created with a pump power $P_{P2}$ of about 2.58 W).

Figure 8:
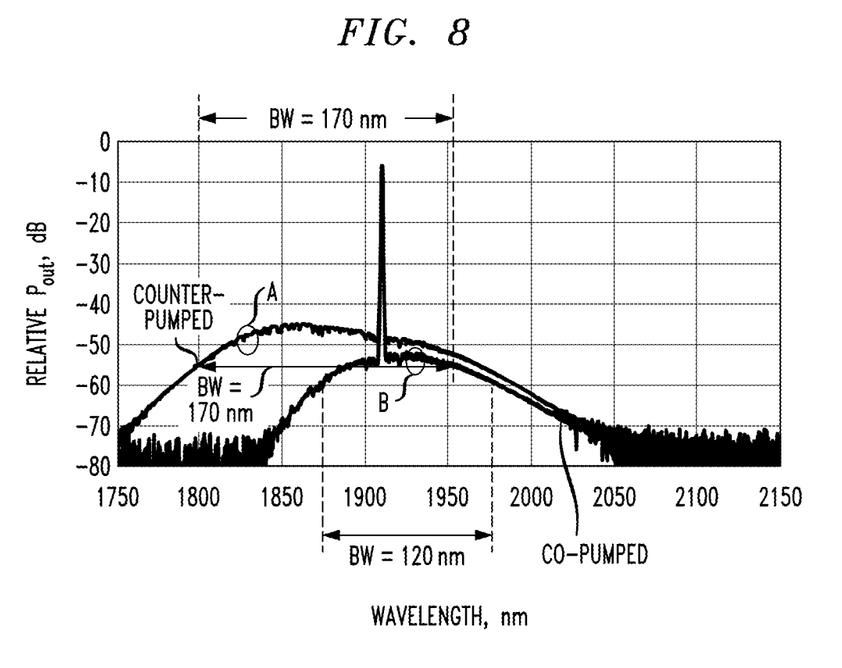
FIG. 8 is a graph of the saturated output spectrum for the same counter-propagating pump configuration of an inventive TDFA as used to provide the data plotted in the graph of FIG. 7, with the data for the con-propagating configuration (from FIG. 4) included here for the sake of comparison.

FIG. 8 illustrates a comparison of the saturated optical spectrum associated with counter-pumped TDFA 10A to that measured for co-pumped TDFA 10 (the latter discussed above in association with FIG. 4). It is noted that the spectrum associated with counter-pumped TDFA 10A (plot A) exhibits a significantly different background ASE distribution than the background ASE for co-pumped TDFA 10 (shown in plot B of FIG. 8; the same data as contained in the plot of FIG. 4). This shift in ASE distribution is caused by the dramatically different distribution of pump light along the length of the counter-pumped amplifier in comparison to the distribution of pump light in the co-pumped amplifier as discussed above, and results in creating a larger operating bandwidth (on the order of about 170 nm, compared to about 120 nm for the co-pumped embodiment), but at the cost of a higher level of noise (and thus a lower OSNR). In particular, output OSNR for TDFA 10A, as derived from the data in plot A, decreases to a value of about 52.4 dB/0.1 nm, compared to the 58.1 dB/0.1 nm output OSNR for TDFA 10. This difference is OSNR is primarily due to the increase of the noise figure in counter-pumped TDFA 10A.

Figure 9:
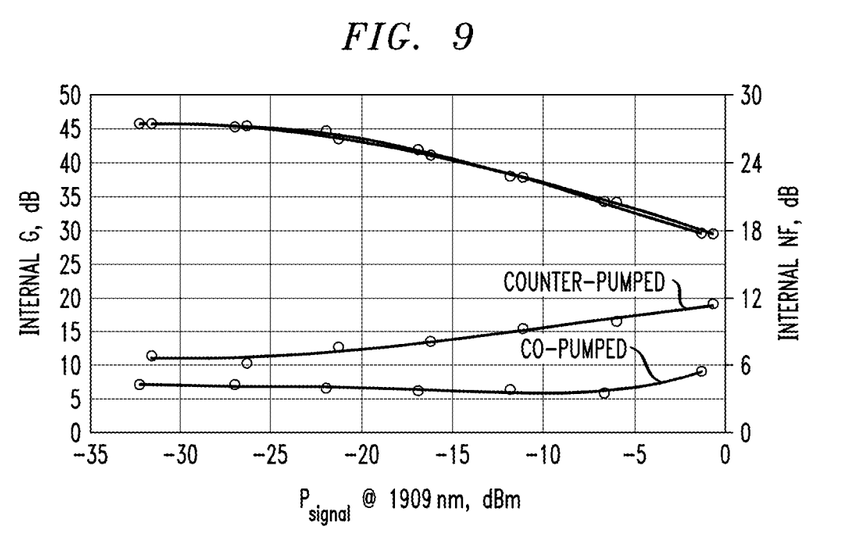
FIG. 9 contains plots of the gain and noise figure for both the counter-propagating TDFA and co-propagating TDFA configurations.

The increased noise figure for counter-pumped TDFA 10A is evident in the data shown in FIG. 9, which shows comparisons of both the small signal gain G and noise figure NF for both co-pumped and counter-pumped TDFA configurations. The gain curves essentially track and are the same for both pumping arrangements, but the minimum noise figure associated with counter-pumped TDFA 10A has risen to about 7 dB, and is further shown as increasing rapidly with increasing input signal power.

It is to be understood that a TDFA formed in accordance with the present invention may be used in conjunction with either a "continuous wave" (CW) input optical signal or a pulsed input optical signal, where the latter is typically the case when used to amplify a digital data signal being transmitted through an optical communications network (for example).

Figure 10:
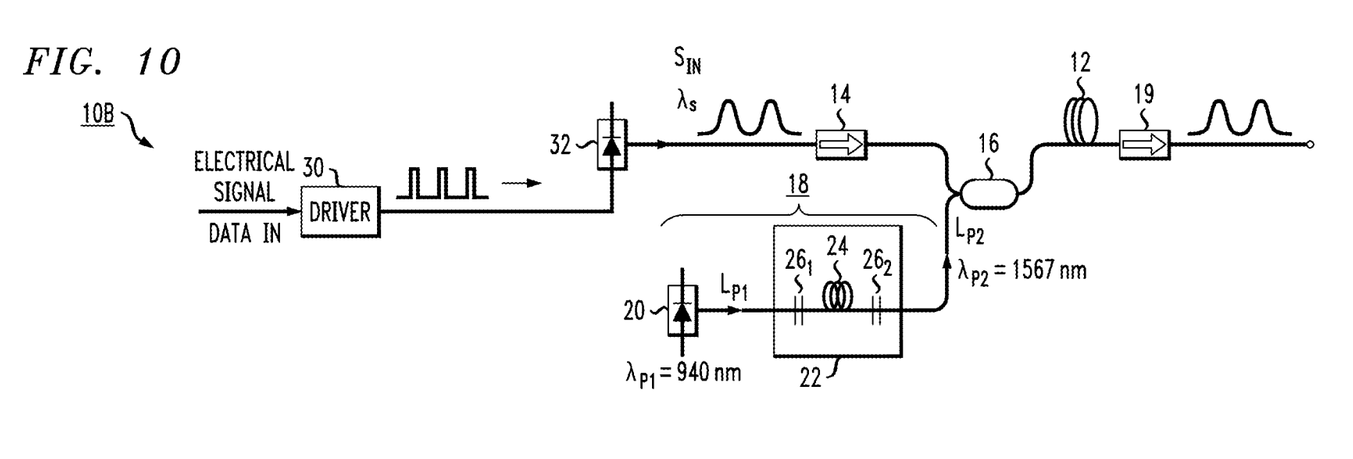
FIG. 10 is a block diagram of an exemplary TDFA formed in accordance with the principles of the present invention, in this case shown as responsive to a pulsed input optical signal.

FIG. 10 illustrates this aspect of the present invention, showing an embodiment of an exemplary "pulsed input" TDFA, designated as TDFA 10B. The embodiment of FIG. 10 utilizes the same components as discussed above in conjunction with TDFA 10 of FIG. 1 in terms of providing amplification for input signals operating within the eye-safe 2 μm wavelength region. Also particularly illustrated in FIG. 10 is a driver circuit 30, which is used to supply an input drive current to a laser diode 32 (operating within the wavelength range of about 1800-2000 nm). In this case, driver circuit 30 responds to an incoming electrical signal $DATA_{IN}$, a digital signal that will be pulsed between "on" and "off". As a result, driver circuit 30 provides a pulsed input to laser diode 32, so as to create an input optical signal $S_{IN}$ that is not "continuous", but is pulsed. TDFA 10B thus functions to amplify the pulses, where the advantage of maintaining a high OSNR allows for clear distinction between the transmitted 1's and 0's of $DATA_{IN}$.

Figure 11:
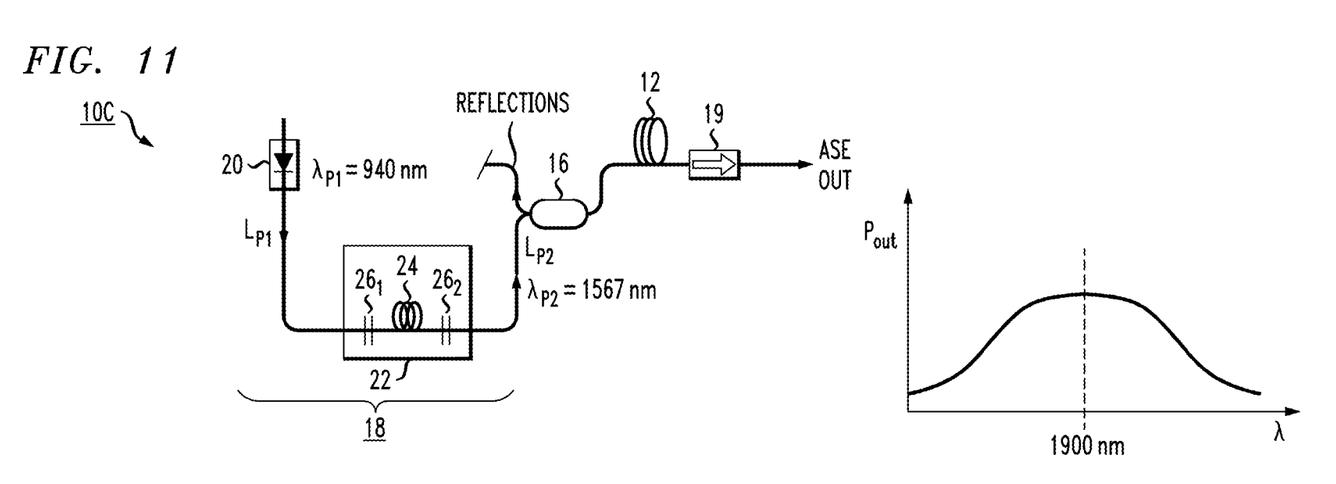
FIG. 11 contains a block diagram of yet another embodiment of the present invention, in this case using the single-clad Tm-doped gain fiber in combination with the pump source to generate a broadband ASE output within the eye-safe wavelength region.

In yet another configuration, TDFA 10 may be used to generate as an output an amplified spontaneous emission (ASE) optical beam. There are applications where there is a need to provide a broadband "noise" signal with a relatively high level of optical power (for example, as an input seed source for fiber optic gyroscopes). FIG. 11 illustrates an exemplary TDFA 10C formed in accordance with the present invention to provide this ASE output. Here, the input signal source $S_{IN}$ is eliminated, shown by fiber termination 40 in FIG. 11 (which may indeed comprise a section of incoming optical fiber 42 cleaved at an appropriate angle, such as 8°.

Without the application of an input signal, pump light $L_{P2}$ is the only optical energy coupled into the TM-doped core region of gain fiber 12. While not rising to the amplified level of an input signal, this pump light is also sufficiently amplified, providing the ASE output as shown in FIG. 11. Inasmuch as only pump light $L_{P2}$ is coupled into gain fiber 12, WDM 16 may be eliminated, with an output fiber 44 from pump source 18 directly spliced to gain fiber 12. However, it is possible that this direct coupling may introduce strong reflections (associated with the peak of the ASE output) back into pump source 18. These reflections are known to degrade the quality of the pump beam and may therefore ultimately degrade the ASE output itself. Thus, the inclusion of WDM 16 functions as a "filter" element in this embodiment to prevent reflections from re-entering pump source 18.

Figure 12:
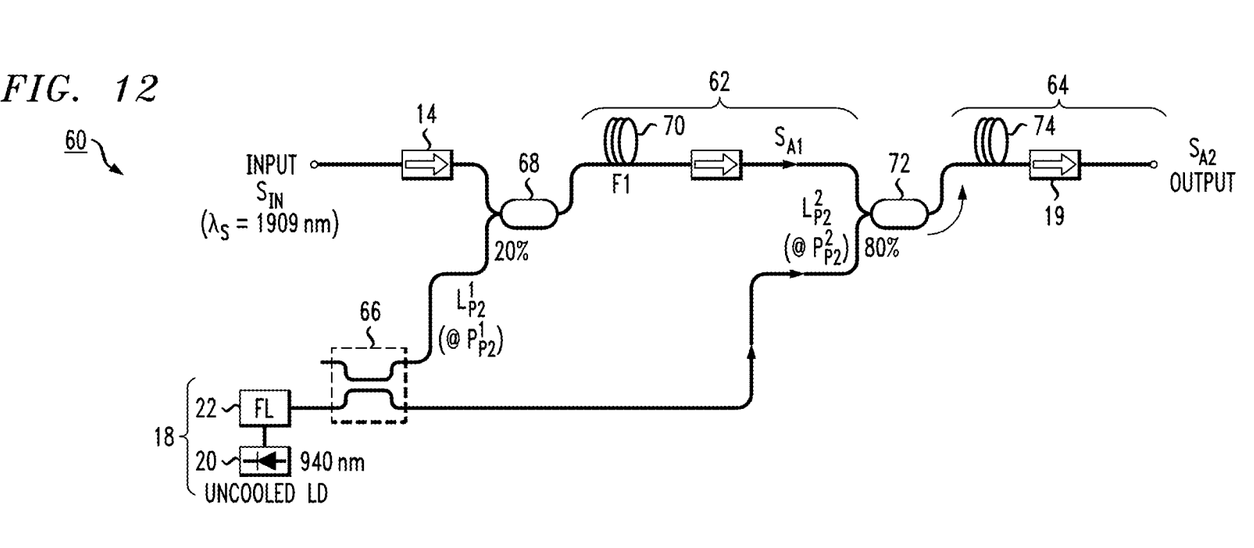
FIG. 12 is a block diagram of an exemplary multi-stage TDFA formed in accordance with the principles of the present invention.

FIG. 12 illustrates yet another embodiment of the present invention. Here, single-clad TDFA is formed as a multi-stage amplifier 60, which may find particular use as a preamplifier for the reasons discussed below. In this particular configuration, multi-stage TDFA 60 comprises a pair of concatenated amplifier stages 62, 64, with each amplifier stage taking the form of a single-clad TDFA. A single pump source 18 is used in this particular arrangement to supply the pump light input $L_{P2}$ at $\lambda_{P2}$ to both first stage 62 and second stage 64 (alternatively, it is to be understood that each stage may include its own pump source, operating at a power appropriate for that stage).

A power splitter 66 is used in this particular embodiment to control the ratio of pump powers within the amplifier stages, creating two separate pump beams. A first pump beam $L_{P2}^1$ output from power splitter 66 (operating at a first power level $P_{P2}^1$) is provided as a pump input to first amplifier stage 62, with a second beam $L_{P2}^2$ (operating at a second power level $P_{P2}^2$) provided as the pump source for second stage 64 (where the sum of $P_{P2}^1$ and $P_{P2}^2$ is ideally equal to the input power $P_{P2}$ of pump source 18).

Referring now in particular to first stage 62, the incoming signal $S_{IN}$ and first pump beam $L_{P2}^1$ are provided as inputs to a first WDM 68, which directs both beams along a common output fiber, which in this case is a first section of single-clad Tm-doped gain fiber 70 (having a length $l_1$). The output from first stage 62, designated $S_{A1}$, is then provided as an input (amplified) signal to second stage 64. As shown, a second WDM 72 is disposed to receive this amplified signal $S_{A1}$, as well as the larger portion ($L_{P2}^2$) of the pump beam. The combination of these two lightwaves is then coupled into a second section of single-clad Tm-doped gain fiber 74 (having a length $l_2$).

In accordance with this multi-stage embodiment of the present invention, each amplifier stage may be separately optimized, in terms of gain fiber length and applied pump power, such that one stage provides maximum gain (for example, first stage 62) and the other stage provides maximum power (here, second stage 64). One particular configuration that exemplifies this optimization may use a first stage gain fiber 70 with $l_1$=3.0 m, pumped with 20% of the total pump power, in combination with a second stage gain fiber 74 of length $l_2$=2.0 m, receiving 80% of the pump power.

The use of a multi-stage TDFA as a preamplifier is particularly advantageous, since it is able to respond to relatively low power input signals and is further able to create a moderate amount of gain within such low-power inputs.

Figure 13:
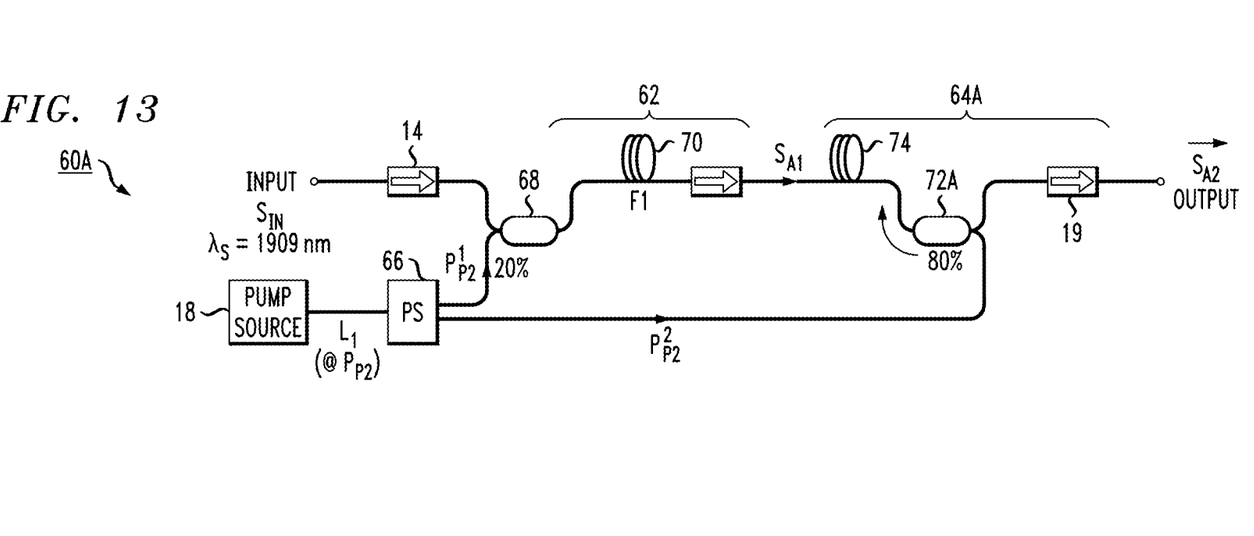
FIG. 13 illustrates another configuration of the multi-stage TDFA of FIG. 12, in this case using a co-propagating pump in an input amplifier stage and a counter-propagating pump in an output amplifier stage.

FIG. 13 illustrates an alternative configuration of the multi-stage amplifier of FIG. 12 (denoted as TDFA 60A in FIG. 13). The components of first stage 62 are the same as described above in association with FIG. 12. In this case, however, second stage 64A utilizes a counter-propagating pump beam, provided via a WDM 72A disposed at the output of Tm-doped gain fiber 74. As with the counter-pumped single stage TDFA discussed above in association with FIG. 6, second stage 64A provides improvement in slope efficiency and power conversion efficiency over the co-pumped arrangement, albeit at the cost of a decrease in overall gain.

Figure 14:
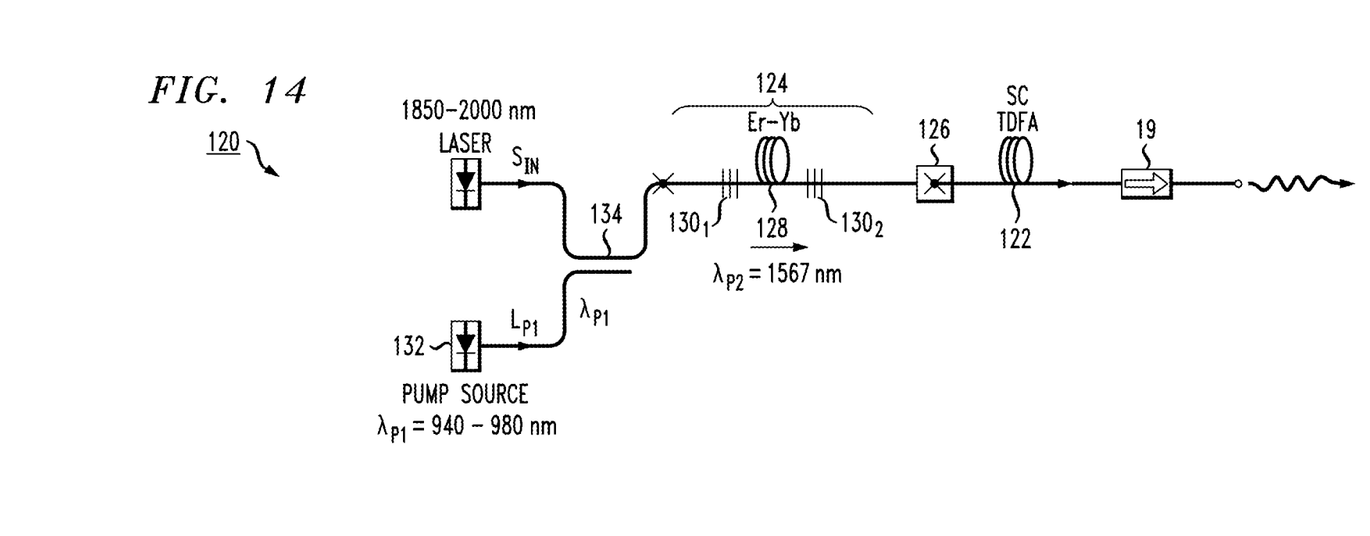
FIG. 14 is a diagram of another embodiment of the present invention, where in this case the doped fiber portion of the pump source is positioned adjacent to the Tm-doped gain fiber.

For some applications, it may be preferable to position the fiber laser component of the pump source adjacent to the single-clad Tm-doped gain fiber. FIG. 14 illustrates an exemplary TDFA 120 formed in this configuration. As with the various embodiments described above, TDFA 120 is based upon the use of a single-clad Tm-doped gain fiber 122. A fiber laser 124 is shown as coupled to the input of gain fiber 122 through a splice element 126. Similar to the configurations described above, fiber laser 124 includes a section of Er—Yb co-doped fiber 128, with a pair of FBGs 1301, 1302 defining the laser cavity itself. Co-doped fiber 128 is formed of double-clad optical fiber, with splice element 126 configured to provide efficient coupling from the core/"first cladding" combination of co-doped fiber 128 into the core region of single clad Tm-doped fiber 122.

In accordance with this embodiment of the present invention, a discrete pump source laser diode 132 is utilized to create a first pump signal $L_{P1}$ (at a first pump wavelength $\lambda_{P1}$ in the range of 910-980 nm, for example), with this beam coupled into a signal/pump combiner 134 (preferably formed of multimode fiber) that is spliced to an input end of Er—Yb co-doped fiber 128. Input signal $S_{IN}$ is also applied as an input to combiner 134, and thus also passes through fiber laser 124 before reaching gain fiber 122. Advantageously, input signal $S_{IN}$ (operating at a wavelength in the range of about 1850 nm to 2000 nm, for example) propagates through fiber laser 124 with minimal attenuation, thus allowing for both doped fiber sections to be disposed in this contiguous fashion, eliminating the need for a WDM to introduce the multi-watt pump into the Tm-doped fiber.

Figure 15:
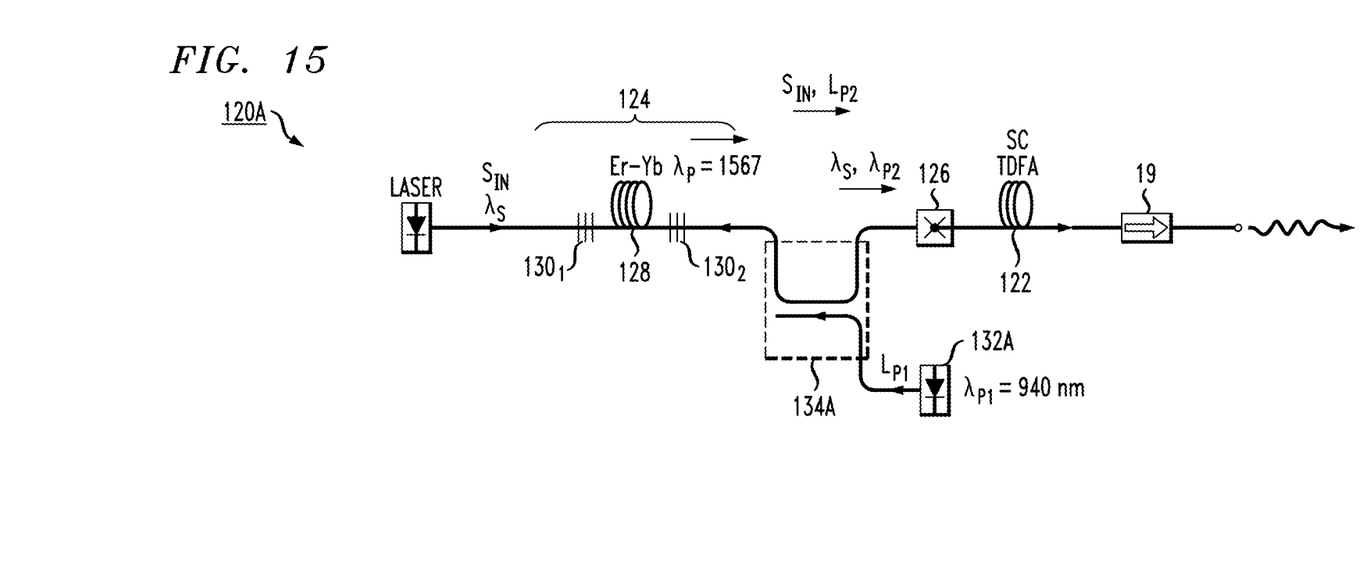
FIG. 15 illustrates an alternative to the embodiment of FIG. 14, where in this case the discrete laser diode associated with the pump source is positioned to propagate through the doped fiber portion of the pump source in a counter-propagating direction.

It is also to be understood that TDFA 120 as discussed above may also be configured in a counter-pumped arrangement. In this case, the output of co-doped fiber 128 (of pump source 124) is not directly coupled to again fiber 122, since a WDM 134A is disposed in the signal path between the two gain fiber sections, as shown in FIG. 15 (FIG. 15 illustrating a counter-propagating embodiment denoted as TDFA 120A). WDM 134A is used in this case to inject the first pump light $L_{P1}$ (at a wavelength $\lambda_{P1}$ in the range of 910-980 nm) in a counter-propagating direction through co-doped fiber 128. In the through-signal direction, both incoming optical signal $S_{IN}$ and the generated pump light $L_{P2}$ pass through WDM 134A relatively unimpeded and are coupled into the Tm-doped core region of gain fiber 122.

While certain preferred embodiments of the present invention have been illustrated and described in detail, it should be apparent that modifications and adaptations to those embodiments may occur to one skilled in the art without departing from the scope of the present invention as set forth in the claims appended hereto. In one case, for example, a multi-watt pump laser diode may be used in place of the combination of a low power semiconductor laser diode and fiber laser. In this case, device such as a Fabry-Perot laser or distributed feedback laser may be utilized and maintained at operate in the 1-3 W range to minimize thermal management problems. Indeed, the described embodiments are to be considered in all respects as only illustrative and not restrictive.

What is claimed is:

1. A broadband optical amplifier for operation across an eye-safe bandwidth region between 1.9 μm and 2.0 μm, comprising:
   a section of single-clad optical gain fiber, including a Tm-doped core region, where an input signal operating at a signal wavelength $\lambda_s$ within the eye-safe bandwidth is coupled into an input endface of the Tm-doped core region of the single-clad optical gain fiber so as to propagate therealong and exit at an output endface thereof; and
   a pump source including a laser diode source and a fiber laser coupled to the laser diode source, the fiber laser creating pump light at a defined pump wavelength $\lambda_{P2}$ with an output power in the range of 1-3 W, the pump light coupled into the Tm-doped core region of the single-clad optical gain fiber so as to interact with the propagating input signal and create an increase in optical power of the propagating input signal as it exits the single-clad optical gain fiber.

2. The broadband optical amplifier as defined in claim 1 wherein the pump light is coupled into the input endface of the Tm-doped core region with the input signal, forming a co-propagating optical amplifier.

3. The broadband optical amplifier as defined in claim 2 wherein the broadband optical amplifier further comprises a wavelength division multiplexer (WDM) disposed at the input to the section of single-clad optical gain fiber, with the input signal and the pump light applied as separate inputs to the WDM and combined therein onto a single output path from the WDM, where the output from the WDM is coupled to the Tm-doped core region of the single-clad optical gain fiber.

4. The broadband optical amplifier as defined in claim 1 wherein the pump light is coupled into the output endface of the Tm-doped core region, forming a counter-propagating optical amplifier with respect to the direction of propagation of the input signal.

5. The broadband optical amplifier as defined in claim 4 wherein a wavelength division multiplexer (WDM) is disposed at the output of the section of single-clad optical gain fiber and the pump light is applied as an input to the WDM and directed as a first output from the WDM into the output endface of the Tm-doped core region of the single-clad optical gain fiber.

6. The broadband optical amplifier as defined in claim 1 wherein the fiber laser of the pump source comprises a section of rare earth-doped fiber disposed between a pair of reflective components defining a laser cavity, with the output from the laser diode source coupled into a core region of the rare earth-doped fiber.

7. The broadband optical amplifier as defined in claim 6 wherein the section of rare earth-doped fiber comprises a section of Er—Yb co-doped fiber.

8. The broadband optical amplifier as defined in claim 6 wherein the pair of reflective components comprises a pair of Bragg gratings inscribed into spaced-apart locations of the section of rare earth-doped fiber.

9. The optical amplifier as defined in claim 6 wherein the section of rare earth-doped fiber of the pump source is spliced to an endface of the single-clad optical gain fiber.

10. The optical amplifier as defined in claim 9 wherein the section of rare earth-doped fiber is coupled to an input endface of the single clad optical gain fiber, where the input signal also propagates through the section of rare earth-doped fiber prior to being coupled into the section of single-clad optical gain fiber, forming a co-propagating amplifier configuration.

11. The optical amplifier as defined in claim 9 wherein the section of rare earth-doped fiber is coupled to an output endface of the single clad optical gain fiber such that the created pump light propagates in a direction counter to the propagation of the input signal, forming a counter-propagating amplifier configuration.

12. The broadband optical amplifier as defined in claim 1 wherein the input signal comprises a CW signal, operating at a single frequency within the eye-safe bandwidth.

13. The broadband optical amplifier as defined in claim 1 wherein the input signal comprises a pulsed optical signal, operating at a single frequency within the eye-safe bandwidth.

14. A multi-stage broadband optical amplifier for operation across an eye-safe bandwidth of 1.9-2.0 µm, comprising:
- a plurality of N sections of single-clad Tm-doped optical fiber disposed in a concatenated configuration, each section defining a separate stage of the multi-stage broadband optical amplifier, wherein an input signal operating at a signal wavelength $\lambda_s$ within the eye-safe bandwidth is coupled into a first, input stage of the multi-stage optical amplifier;
- a pump source providing pump light at a defined pump wavelength $\lambda_P$ with a multi-watt output power, the pump source including a laser diode source and a fiber laser coupled to the laser diode source, wherein defined parameters of the fiber laser are configured to provide a multi-watt output at the defined pump wavelength XP; and
- a 1:N power splitter coupled between an output of the pump source and a pump light input of each stage of the multi-stage broadband optical amplifier so as to provide a separate pump beam for propagating through each section of single-clad Tm-doped optical fiber of the plurality of N sections of single-clad Tm-doped optical fiber, each pump beam interacting with the propagating input signal and creating an increase in optical power of the propagating input signal as it passes through each stage of the multi-stage optical amplifier.

15. The multi-stage broadband optical amplifier as defined in claim 14 wherein the 1:N power splitter is configured to provide different fractions of pump power to each stage of the multi-stage broadband optical amplifier.

16. The multi-stage broadband optical amplifier as defined in claim 14 wherein the 1:N power splitter is configured to provide co-propagating pump inputs to each stage of the multi-stage broadband optical amplifier.

17. The multi-stage broadband optical amplifier as defined in claim 14 wherein the 1:N power splitter is configured to provide counter-propagating pump inputs to each stage of the multi-stage broadband optical amplifier.

18. The multi-stage broadband optical amplifier as defined in claim 14 wherein the 1:N power splitter is configured to provide at least one co-propagating pump input to a stage of the multi-stage broadband optical amplifier and provide at least one counter-propagating pump input to a different stage of the multi-stage broadband optical amplifier.

19. A broadband optical amplifier for operation across an eye-safe bandwidth of 1.9-2.0 µm, comprising:
- a section of single-clad optical gain fiber, including a Tm-doped core region, where an input signal operating at a signal wavelength $\lambda_s$ within the eye-safe bandwidth is coupled into an input endface of the Tm-doped core region of the single-clad optical gain fiber so as to propagate therealong and exit at an output endface thereof; and
- a pump source for providing pump light at a defined pump wavelength $\lambda_{P2}$ with an output power in the range of 1-3 W, the pump light coupled into the Tm-doped core region of the single-clad optical gain fiber so as to interact with the propagating input signal and create an increase in optical power of the propagating input signal as it exits the single-clad optical gain fiber as an amplified output signal from the broadband optical amplifier.

* * * * *